United States Patent
Mishra et al.

(10) Patent No.: US 10,143,230 B2
(45) Date of Patent: Dec. 4, 2018

(54) TOBACCO-FREE POUCHED PRODUCT CONTAINING FLAVOR BEADS PROVIDING IMMEDIATE AND LONG LASTING FLAVOR RELEASE

(71) Applicant: Philip Morris USA Inc., Richmond, VA (US)

(72) Inventors: Munmaya K. Mishra, Manakin Sabot, VA (US); Biao Duan, Richmond, VA (US); Daqing Wu, Suwanee, GA (US); William R. Sweeney, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 933 days.

(21) Appl. No.: 14/290,516

(22) Filed: May 29, 2014

(65) Prior Publication Data

US 2014/0261506 A1    Sep. 18, 2014

Related U.S. Application Data

(63) Continuation of application No. 12/789,125, filed on May 27, 2010, now Pat. No. 8,747,562, which is a (Continued)

(51) Int. Cl.
*A24B 15/16* (2006.01)
*A24B 15/28* (2006.01)
*A24B 13/00* (2006.01)

(52) U.S. Cl.
CPC .............. *A24B 15/16* (2013.01); *A24B 13/00* (2013.01); *A24B 15/283* (2013.01); *A23V 2002/00* (2013.01)

(58) Field of Classification Search
None
See application file for complete search history.

(56) References Cited

U.S. PATENT DOCUMENTS

| | | |
|---|---|---|
| 307,537 A | 11/1884 | Foulks |
| 1,234,279 A | 7/1917 | Buchanan |

(Continued)

FOREIGN PATENT DOCUMENTS

| | | |
|---|---|---|
| EP | 0212234 A2 | 7/1986 |
| EP | 0 145 499 | 4/1989 |

(Continued)

OTHER PUBLICATIONS

International Preliminary Report on Patentability dated Jan. 19, 2010 for PCT/IB2008/002764.

(Continued)

*Primary Examiner* — Michael J Felton
(74) *Attorney, Agent, or Firm* — Buchanan Ingersoll & Rooney LLP

(57) ABSTRACT

A tobacco-free oral pouch product providing immediate and long lasting flavor release comprises a pouch wrapper and tobacco-free flavor beads contained within the pouch wrapper. The flavor beads comprise at least one of microcrystalline cellulose, pectin and sodium alginate, at least one polymer having a higher solubility in saliva than microcrystalline cellulose, pectin and/or sodium alginate, and at least one flavorant. The pectin and sodium alginate are cross-linked. The tobacco-free flavor beads provide immediate release of the flavorant upon placement of a pouch product in a user's mouth and long lasting release of the flavorant for about 15 minutes to about 80 minutes. The oral pouch product contains only tobacco-free flavor beads.

12 Claims, 1 Drawing Sheet

Related U.S. Application Data continuation of application No. 12/577,034, filed on Oct. 9, 2009.

(56) References Cited

U.S. PATENT DOCUMENTS

| | | | |
|---|---|---|---|
| 1,376,586 | A | 5/1921 | Schwartz |
| 1,992,152 | A | 2/1935 | Yeates |
| 2,313,696 | A | 3/1941 | Yates |
| 2,306,400 | A | 12/1942 | Menzel |
| 2,318,101 | A | 5/1943 | Rose |
| 2,330,361 | A | 9/1943 | Howard |
| 2,528,778 | A | 11/1950 | Piazze |
| 3,067,068 | A | 12/1962 | Finberg |
| 3,162,199 | A | 12/1964 | Moll, Jr. |
| 3,174,889 | A | 3/1965 | Anderson et al. |
| 3,188,265 | A | 6/1965 | Charbonneau et al. |
| 3,369,551 | A | 2/1968 | Carroll |
| 3,415,286 | A | 12/1968 | Arnold et al. |
| 3,600,807 | A | 8/1971 | Sipos |
| 3,607,299 | A | 9/1971 | Bolt |
| 3,692,536 | A | 9/1972 | Fant |
| 3,757,798 | A | 9/1973 | Lambert |
| 3,846,569 | A | 11/1974 | Kaplan |
| 3,932,192 | A | 1/1976 | Nakashio et al. |
| 4,218,286 | A | 8/1980 | Jones et al. |
| 4,347,857 | A | 9/1982 | Boden |
| 4,386,106 | A | 5/1983 | Merritt et al. |
| 4,515,769 | A | 5/1985 | Merritt et al. |
| 4,545,392 | A | 10/1985 | Sensabaugh et al. |
| 4,565,702 | A | 1/1986 | Morley et al. |
| 4,607,479 | A | 8/1986 | Linden |
| 4,624,269 | A | 11/1986 | Story et al. |
| 4,660,577 | A | 4/1987 | Sensabaugh |
| 4,703,765 | A | 11/1987 | Paules et al. |
| 4,797,287 | A | 1/1989 | Pich et al. |
| 4,880,697 | A | 11/1989 | Caldwell et al. |
| 4,892,483 | A | 1/1990 | Douglas, Jr. |
| 4,893,639 | A | 1/1990 | White |
| 4,906,488 | A | 3/1990 | Pera |
| 4,907,605 | A | 3/1990 | Ray et al. |
| 4,917,161 | A | 4/1990 | Townend |
| 4,971,797 | A | 11/1990 | Cherukuri et al. |
| 4,981,522 | A | 1/1991 | Nichols et al. |
| 5,127,208 | A | 7/1992 | Custer et al. |
| 5,144,964 | A | 9/1992 | Demain |
| 5,167,244 | A | 12/1992 | Kjerstad |
| 5,174,088 | A | 12/1992 | Focke et al. |
| 5,186,185 | A | 2/1993 | Mashiko et al. |
| 5,211,985 | A | 5/1993 | Shirley, Jr. et al. |
| 5,240,016 | A | 8/1993 | Nichols et al. |
| 5,263,999 | A | 11/1993 | Baldwin et al. |
| 5,346,734 | A | 9/1994 | Wydick, Jr. |
| 5,372,149 | A | 12/1994 | Roth et al. |
| 5,387,416 | A | 2/1995 | White et al. |
| 5,479,949 | A | 1/1996 | Battard et al. |
| 5,525,351 | A | 6/1996 | Dam |
| 5,549,906 | A | 8/1996 | Santus |
| 5,601,716 | A | 2/1997 | Heinrich et al. |
| 5,726,161 | A | 3/1998 | Whistler |
| 5,733,559 | A | 3/1998 | Citernesi |
| 5,773,062 | A | 6/1998 | Cirigliano et al. |
| 5,780,055 | A | 7/1998 | Habib et al. |
| 5,806,408 | A | 9/1998 | DeBacker et al. |
| 5,829,453 | A | 11/1998 | White et al. |
| 5,921,955 | A | 7/1999 | Mazer et al. |
| 5,927,052 | A | 7/1999 | Nippes et al. |
| 5,997,691 | A | 12/1999 | Gautam et al. |
| 6,021,624 | A | 2/2000 | Richison et al. |
| 6,046,177 | A | 4/2000 | Stella et al. |
| 6,048,736 | A | 4/2000 | Kosak |
| 6,135,120 | A | 10/2000 | Löfman et al. |
| 6,143,316 | A | 11/2000 | Hayden et al. |
| 6,146,655 | A | 11/2000 | Ruben |
| 6,162,516 | A | 12/2000 | Derr |
| 6,200,949 | B1 | 3/2001 | Reijmer et al. |
| 6,280,761 | B1 | 8/2001 | Santus |
| 6,287,603 | B1 | 9/2001 | Prasad et al. |
| 6,287,612 | B1 | 9/2001 | Mandava et al. |
| 6,325,859 | B1 * | 12/2001 | De Roos ........... A24B 15/283 131/274 |
| 6,375,981 | B1 * | 4/2002 | Gilleland ........... A61K 9/4816 424/451 |
| 6,383,475 | B1 | 5/2002 | Meyers et al. |
| 6,414,033 | B1 | 7/2002 | Sceusa |
| 6,444,253 | B1 | 9/2002 | Conklin et al. |
| 6,455,068 | B1 | 9/2002 | Licari |
| 6,557,561 | B1 | 5/2003 | Miyauchi et al. |
| 6,565,710 | B2 | 5/2003 | Salow et al. |
| 6,706,120 | B2 | 3/2004 | Miyauchi et al. |
| D489,606 | S | 5/2004 | Lofman |
| 6,793,949 | B2 | 9/2004 | Panesar |
| 6,871,473 | B1 | 3/2005 | Dutt et al. |
| 6,878,695 | B2 | 4/2005 | Woo et al. |
| 6,884,885 | B2 | 4/2005 | Qi |
| 6,895,974 | B2 | 5/2005 | Peele |
| 6,942,848 | B2 | 9/2005 | Nelson et al. |
| 6,958,429 | B2 | 10/2005 | Bruhn et al. |
| 6,982,093 | B2 | 1/2006 | Licari |
| 6,984,376 | B2 | 1/2006 | Stephenson et al. |
| 7,030,092 | B1 | 4/2006 | Levine |
| 7,032,601 | B2 | 4/2006 | Atchley et al. |
| 7,090,858 | B2 | 8/2006 | Jayaraman |
| 7,115,586 | B2 | 10/2006 | Loftsson |
| 7,166,671 | B2 | 1/2007 | Wood et al. |
| 7,186,701 | B2 | 3/2007 | Kubota et al. |
| D568,576 | S | 5/2008 | Neidle et al. |
| D585,626 | S | 2/2009 | Chappell, Sr. et al. |
| 7,488,503 | B1 | 2/2009 | Porzio et al. |
| 7,584,843 | B2 | 9/2009 | Kutsch et al. |
| 8,597,642 | B2 | 12/2013 | Diguet et al. |
| 2002/0012689 | A1 | 1/2002 | Stillman |
| 2003/0070687 | A1 | 4/2003 | Atchley et al. |
| 2004/0015756 | A1 | 1/2004 | Chiu |
| 2004/0018293 | A1 | 1/2004 | Popplewell et al. |
| 2004/0118421 | A1 | 6/2004 | Hodin et al. |
| 2004/0123873 | A1 | 7/2004 | Calandro et al. |
| 2004/0145261 | A1 | 7/2004 | Ganter et al. |
| 2004/0191366 | A1 * | 9/2004 | Mangos ................ A23G 4/20 426/89 |
| 2004/0202698 | A1 | 10/2004 | Ramji et al. |
| 2005/0003048 | A1 | 1/2005 | Pearce et al. |
| 2005/0034738 | A1 | 2/2005 | Whalen |
| 2005/0061339 | A1 | 3/2005 | Hansson et al. |
| 2005/0081264 | A1 | 4/2005 | Brugliera et al. |
| 2005/0100640 | A1 | 5/2005 | Pearce |
| 2005/0172976 | A1 | 8/2005 | Newman et al. |
| 2005/0178398 | A1 | 8/2005 | Breslin et al. |
| 2005/0210615 | A1 | 9/2005 | Shastry et al. |
| 2005/0241656 | A1 | 11/2005 | Kennison |
| 2005/0244521 | A1 | 11/2005 | Strickland et al. |
| 2005/0287249 | A1 | 12/2005 | Shukla et al. |
| 2006/0039973 | A1 | 2/2006 | Aldritt et al. |
| 2006/0073190 | A1 | 4/2006 | Carroll et al. |
| 2006/0118589 | A1 | 6/2006 | Arnarp et al. |
| 2006/0144412 | A1 | 7/2006 | Mishra et al. |
| 2006/0174901 | A1 | 8/2006 | Karles et al. |
| 2006/0191548 | A1 | 8/2006 | Strickland et al. |
| 2006/0204598 | A1 | 9/2006 | Thompson |
| 2006/0228431 | A1 | 10/2006 | Eben et al. |
| 2006/0231113 | A1 | 10/2006 | Newbery et al. |
| 2006/0272662 | A1 | 12/2006 | Jupe et al. |
| 2006/0275344 | A1 | 12/2006 | Mody et al. |
| 2007/0000505 | A1 | 1/2007 | Zhuang et al. |
| 2007/0012328 | A1 | 1/2007 | Winterson et al. |
| 2007/0042184 | A1 | 2/2007 | Coyne et al. |
| 2007/0048431 | A1 | 3/2007 | Budwig et al. |
| 2007/0062549 | A1 | 3/2007 | Holton, Jr. et al. |
| 2007/0077307 | A1 | 4/2007 | Rosenberg et al. |
| 2007/0095356 | A1 | 5/2007 | Winterson et al. |
| 2007/0107747 | A1 | 5/2007 | Hill et al. |
| 2007/0122526 | A1 | 5/2007 | Sweeney et al. |
| 2007/0186941 | A1 | 8/2007 | Holton, Jr. et al. |
| 2007/0186942 | A1 | 8/2007 | Strickland et al. |
| 2007/0186943 | A1 | 8/2007 | Strickland et al. |

(56) References Cited

U.S. PATENT DOCUMENTS

| | | | |
|---|---|---|---|
| 2007/0186944 A1 | 8/2007 | Strickland et al. | |
| 2007/0190157 A1 | 8/2007 | Sanghvi et al. | |
| 2007/0207239 A1 | 9/2007 | Neidle et al. | |
| 2007/0261707 A1 | 11/2007 | Winterson et al. | |
| 2007/0267033 A1 | 11/2007 | Mishra et al. | |
| 2007/0298061 A1 | 12/2007 | Boghani et al. | |
| 2008/0014303 A1 | 1/2008 | Jacops et al. | |
| 2008/0029110 A1 | 2/2008 | Dube et al. | |
| 2008/0029116 A1 | 2/2008 | Robinson et al. | |
| 2008/0029117 A1 | 2/2008 | Mua et al. | |
| 2008/0044481 A1* | 2/2008 | Harel | A61K 9/127 424/490 |
| 2008/0081071 A1 | 4/2008 | Sanghvi et al. | |
| 2008/0113031 A1 | 5/2008 | Moodley et al. | |
| 2008/0166395 A1 | 7/2008 | Roush | |
| 2008/0173317 A1 | 7/2008 | Robinson et al. | |
| 2008/0196730 A1 | 8/2008 | Engstrom et al. | |
| 2008/0202536 A1 | 8/2008 | Torrence et al. | |
| 2008/0302682 A1 | 12/2008 | Engstrom et al. | |
| 2008/0308115 A1 | 12/2008 | Zimmerman et al. | |
| 2008/0317911 A1 | 12/2008 | Schleef et al. | |
| 2009/0004329 A1 | 1/2009 | Gedevanishvili et al. | |
| 2009/0022856 A1 | 1/2009 | Cheng et al. | |
| 2009/0022917 A1 | 1/2009 | Gedevanishvili et al. | |
| 2009/0025740 A1 | 1/2009 | Chappell, Sr. et al. | |
| 2009/0025741 A1 | 1/2009 | Crawford et al. | |
| 2009/0035414 A1 | 2/2009 | Cheng et al. | |
| 2009/0038631 A1 | 2/2009 | Mishra et al. | |
| 2009/0105331 A1 | 4/2009 | Schaffner et al. | |
| 2009/0126746 A1 | 5/2009 | Strickland et al. | |
| 2010/0218779 A1 | 9/2010 | Zhuang et al. | |
| 2010/0300464 A1 | 12/2010 | Gee et al. | |
| 2010/0300465 A1 | 12/2010 | Zimmermann | |

FOREIGN PATENT DOCUMENTS

| | | | |
|---|---|---|---|
| EP | 0352107 A2 | 1/1990 | |
| EP | 0483500 A1 | 5/1992 | |
| EP | 1010639 A1 | 6/2000 | |
| EP | 1118274 A | 7/2001 | |
| GB | 725764 | 3/1955 | |
| GB | 924052 | 4/1963 | |
| GB | 1139684 | 1/1969 | |
| GB | 1350740 | 4/1974 | |
| GB | 2074838 A | 11/1981 | |
| JP | 03-240665 | 10/1991 | |
| WO | WO 94/25356 | 11/1994 | |
| WO | WO 97/45336 | 12/1997 | |
| WO | WO 98/15191 | 4/1998 | |
| WO | WO 99/40799 | 8/1999 | |
| WO | WO 00/57713 | 10/2000 | |
| WO | WO 01/70591 A1 | 9/2001 | |
| WO | WO 02/080707 A1 | 10/2002 | |
| WO | WO 03/028492 A1 | 4/2003 | |
| WO | WO 03/030881 | 4/2003 | |
| WO | WO 03/053175 A2 | 7/2003 | |
| WO | WO 2004/009445 | 1/2004 | |
| WO | WO 2004/052335 | 6/2004 | |
| WO | WO 2004/056219 | 7/2004 | |
| WO | WO 2004/058217 | 7/2004 | |
| WO | WO 2004/064811 A1 | 8/2004 | |
| WO | WO 2004/066986 | 8/2004 | |
| WO | WO 2004/095959 A1 | 11/2004 | |
| WO | WO 2004/098318 | 11/2004 | |
| WO | WO 2005/027815 | 3/2005 | |
| WO | WO 2005/046363 | 5/2005 | |
| WO | WO 2005/077232 | 8/2005 | |
| WO | WO 2005/084446 | 9/2005 | |
| WO | WO 2006/004480 A1 | 1/2006 | |
| WO | WO 2006/039487 A | 4/2006 | |
| WO | WO 2006/065192 | 6/2006 | |
| WO | WO2006/090290 A | 8/2006 | |
| WO | WO 2006/105173 A2 | 10/2006 | |
| WO | WO 2006/120570 A2 | 11/2006 | |
| WO | WO 2006/127772 A | 11/2006 | |
| WO | WO 2007/037962 A1 | 4/2007 | |
| WO | WO2007/037962 A1 | 4/2007 | |
| WO | WO 2007/057789 A2 | 5/2007 | |
| WO | WO2007/057789 A2 | 5/2007 | |
| WO | WO2007/057791 A2 | 5/2007 | |
| WO | WO2007/082599 A1 | 7/2007 | |
| WO | WO 2007/104573 | 9/2007 | |
| WO | WO 2007/126361 A1 | 11/2007 | |
| WO | WO 2008/016520 A2 | 2/2008 | |
| WO | WO 2008/042331 A2 | 4/2008 | |
| WO | WO 2008/104891 A2 | 9/2008 | |
| WO | WO 2008/140372 A1 | 11/2008 | |
| WO | WO 2009/010875 | 1/2009 | |

OTHER PUBLICATIONS

International Preliminary Report on Patentability dated Jan. 19, 2010 for PCT/IB2008/002714.
International Search Report and Written Opinion dated Mar. 31, 2011 for International Application No. PCT/EP2010/006191.
International Preliminary Report on Patentability dated Dec. 16, 2008 for PCT/IB2006/002680.
International Preliminary Report on Patentability dated Dec. 11, 2009 for PCT/IB2008/002598.
International Preliminary Report on Patentability dated Jan. 19, 2010 for PCT/IB2008/002682.
International Preliminary Report on Patentability dated Jan. 19, 2010 for PCT/IB2008/002694.
International Search Report and Written Opinion dated Jul. 17, 2009 for PCT/IB2008/002714.
International Search Report and Written Opinion dated Jul. 25, 2006 for PCT/IB2006/001114.
International Search Report and Written Opinion dated Aug. 6, 2007 for PCT/IB2006/004077.
Partial International Search Report dated Oct. 6, 2006 for PCT/IB2006/001611.
International Search Report and Written Opinion dated Jan. 30, 2009 for PCT/IB2008/002598.
International Search Report and Written Opinion dated Feb. 25, 2009 for PCT/IB2008/002566.
International Search Report and Written Opinion dated Feb. 27, 2007 for PCT/IB2006/002680.
International Search Report and Written Opinion dated Mar. 13, 2009 for PCT/IB2008/002694.
International Search Report and Written Opinion dated Mar. 24, 2009 for PCT/IB2008/002764.
International Search Report and Written Opinion dated Mar. 25, 2009 for PCT/IB2008/002682.
International Search Report and Written Opinion dated Mar. 31, 2009 for PCT/IB2008/002681.
Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757C0A9629C8B63.
International Preliminary Report on Patentability dated Apr. 11, 2012 for PCT/EP2010/006191.
International Preliminary Report on Patentability dated Aug. 28, 2007 for PCT/IB2006/001114.
International Search Report and Written Opinion dated Sep. 12, 2008 for PCT/IB2008/001378.
International Preliminary Report on Patentability dated Oct. 30, 2007 for PCT/IB2006/001611.
U.S. Appl. No. 12/642,399, filed Dec. 18, 2009.
U.S. Appl. No. 12/748,043, filed Mar. 26, 2010.
U.S. Appl. No. 12/748,205, filed Mar. 26, 2010.
U.S. Appl. No. 12/805,868, filed Aug. 20, 2010.

* cited by examiner

TOBACCO-FREE POUCHED PRODUCT CONTAINING FLAVOR BEADS PROVIDING IMMEDIATE AND LONG LASTING FLAVOR RELEASE

CROSS REFERENCE TO RELATED APPLICATIONS

This application is a continuation of U.S. patent application Ser. No. 12/789,125, filed May 27, 2010, entitled TOBACCO-FREE POUCHED PRODUCT CONTAINING FLAVOR BEADS PROVIDING IMMEDIATE AND LONG LASTING FLAVOR RELEASE which is a continuation of U.S. patent application Ser. No. 12/577,034, filed Oct. 9, 2009, now abandoned, the entire content of each is hereby incorporated by reference.

SUMMARY

Provided is a tobacco-free oral pouch product containing flavor beads providing immediate and long lasting flavor release. The tobacco-free oral pouch product comprises a pouch wrapper and tobacco-free flavor beads contained within the pouch wrapper. The flavor beads comprise one of microcrystalline cellulose, pectin and sodium alginate, at least one polymer having a higher solubility in saliva than one of microcrystalline cellulose, pectin and sodium alginate, and at least one flavorant. The pectin and said sodium alginate are cross-linked. The tobacco-free flavor beads provide immediate release of the flavorant upon placement in a user's mouth and long lasting release of the flavorant for about 15 minutes to about 80 minutes. The oral pouch product contains only tobacco-free flavor beads.

DETAILED DESCRIPTION

Figure 1:
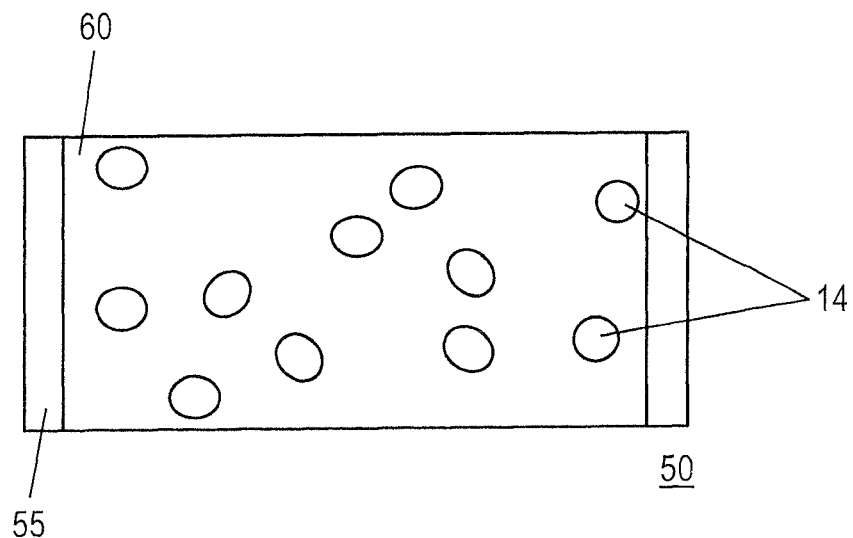
FIG. 1 is an illustration of a pouched, oral tobacco product containing only tobacco-free flavor beads.

Provided is an oral pouch product containing only tobacco-free flavor beads. The tobacco-free flavor beads comprise microcrystalline cellulose (MCC), pectin and/or sodium alginate and at least one flavorant. When pectin and/or sodium alginate are used, the pectin and/or sodium alginate are cross-linked. In addition, the flavor beads contain at least one additional polymer that has a higher solubility in saliva than MCC, cross-linked pectin and/or cross-linked sodium alginate. The flavor beads provide immediate and long lasting flavor release during use.

As used herein, the term "an oral pouch product" generally denotes a pouch product which fits in a user's mouth and delivers a desirable taste, aroma, chemesthetic effect or combination of two or more of these when placed through contact with the consumer's taste buds, olfactory receptors, or both, preferably via the consumer's saliva. The oral pouch product contains tobacco-free flavor beads that provide immediate and long lasting release of flavors during use.

As used herein, the term "flavorant" denotes a compound having a desirable taste, aroma or both. Examples of suitable flavorants are described herein.

In a first embodiment, the flavor beads can be prepared using known extrusion and spheronization processes for producing pharmaceutical pellets and flavored beads such as the techniques described in commonly owned U.S. Patent Application Publication No. 2007/0000505, filed on Feb. 22, 2006, the entire content of which is incorporated herein by reference.

Preferably, the extruded and spheronized tobacco-free flavor beads are formed by mixing microcrystalline cellulose (MCC) and at least one additional polymer having a higher solubility in saliva than MCC with water to form a paste or dough, to which is added a solution, suspension, or emulsion of flavorant. In the preferred embodiment, the additional polymer is hydroxypropyl methyl cellulose. The MCC, hydroxypropyl methyl cellulose, flavorant-containing liquid, and any additional water or aqueous solution added to obtain the desired consistency can be mixed using a ribbon blender, Banbury, or other mixing apparatus capable of mixing high solids content materials. While not wishing to be bound by any theory, it is believed that the kneading of the liquid flavorant with the solids causes the liquid to disperse into the solid and become physically entrapped therein.

The dough-like material is then forced through an extruder to form strands of extrudate. The extrudate is broken into short strands and spheronized to form wet spheres. The flavor beads can be spheronized from the extrudate by using an LCI QJ-230T Marumerizer at a suitable rotation speed (e.g., 1200 RPM) for a suitable time (e.g., 10 minutes). Preferably, the flavor beads are then dried to remove a portion of the liquid. Additionally flavorants and/or coatings can be added to the flavor beads after drying.

In the preferred embodiment, the flavor beads contain MCC. MCC improves the physical strength, integrity, and processability of the flavor beads (e.g., during preparation of flavor beads). MCC is a structure-building material which helps to provide physical encapsulation of the flavorant immobilized in the flavor beads. In addition, due to the low solubility of the MCC, it can also help to adjust the degradation and release rate of the flavorant during consumption of the oral pouch product. In the preferred embodiment, MCC is added in an amount of at least about 50 wt %, based on the total weight of the flavor beads and more particularly in an amount of about 60 wt % to about 80 wt % based on the total weight of the flavor beads.

Also preferably, the flavorant is added to the MCC containing flavor beads in an amount of less than about 60 wt % based on the total weight of the flavor beads and more particularly in an amount of about 10 wt % to about 30 wt % based on the total weight of the flavor beads. Suitable flavorants include, without limitation, any natural or synthetic flavor or aroma, such as tobacco, menthol, peppermint, spearmint, chocolate, licorice, citrus, gamma octalactone, vanillin, ethyl vanillin, breath freshener flavors, cinnamon, methyl salicylate, linalool, bergamot oil, geranium oil, lemon oil, ginger oil, pomegranate, acai, raspberry, blueberry, strawberry, gooseberry, wolfberry, mulberry, blackcurrant, redcurrant, sea buckthorn, blackberry, boysenberry, cranberry, bourbon, scotch, whiskey, cognac, hydrangea, lavender, apple, peach, pear, cherry, plum, orange, lime, grape, grapefruit, butter, rum, coconut, almond, pecan, walnut, peanut, hazelnut, French vanilla, macadamia, sugar cane, maple, cassis, caramel, banana, malt, espresso, kahlua, white chocolate, clove, cilantro, basil, oregano, curry, garlic, mustard, nutmeg, rosemary, thyme, tarragon, dill, sage, anise, fennel, jasmine, coffee, olive oil, sesame oil, sunflower oil, balsamic vinegar, rice wine vinegar, or red wine vinegar. Other suitable components may include flavor compounds selected from the group consisting of an acid, an alcohol, an ester, an aldehyde, a ketone, a pyrazine, combinations or blends thereof and the like. Suitable flavor compounds may be selected, for example, from the group consisting of phenylacetic acid, solanone, megastigmatrienone, 2-heptanone, benzylalcohol, cis-3-hexenyl acetate, valeric acid, valeric aldehyde, ester, terpene, sesquiterpene, nootkatone, maltol, damascenone, pyrazine, lactone, anethole, iso-valeric acid, combinations thereof and the like.

Also preferably, the flavor beads contain at least one additional polymer having a higher solubility in saliva than MCC. In the preferred embodiment, the additional polymer is hydroxypropyl methyl cellulose. Preferably, the hydroxypropyl methyl cellulose is included in an amount of up to about 20 wt % based on the total weight of the flavor beads. Most preferably, the hydroxypropyl methyl cellulose is included in an amount of about 2 wt % to about 6 wt % based on the total weight of the flavor beads.

Not wishing to be bound by theory, it is believed that the hydroxypropyl methyl cellulose helps control the flavor release rate in the final tobacco-free flavor beads because the hydroxypropyl methyl cellulose has a higher solubility in saliva than MCC. As such, the hydroxypropyl methyl cellulose dissolves more quickly thereby releasing the flavorant more quickly. Thus, the flavor bead's flavor release rate can be adjusted by changing the polymer ratio in the flavor bead. For example, flavor beads containing more hydroxypropyl methyl cellulose will have a faster flavor release rate than flavor beads having a lower hydroxypropyl methyl cellulose content. Also, the hydroxypropyl methyl cellulose provides a smooth and creamy texture to the flavor beads. In addition, the hydroxypropyl methyl cellulose exhibits lipophillic characteristics with excellent emulsification properties that aid in incorporating hydrophobic flavorants into the flavor beads.

Thus, preferred tobacco-free flavor beads comprising MCC release flavorants for about 15 to about 35 minutes (e.g. about 20 minutes to about 35 minutes or about 25 minutes to about 30 minutes).

The following examples are exemplary and are not meant to limit any aspects of the embodiments disclosed herein.

EXAMPLE 1

About 100 grams MCC, 10 grams of hydroxypropyl methyl cellulose and 80 grams of berry flavor are well mixed with 100 grams of deionized water to form a flavored wet mass at room temperature. The flavored wet mass is extruded at 40 rpm using an LCI bench-scale extruder. The extrudate is spheronized at 1450 rpm by a LCI spheronizer at room temperature for 5 minutes to form flavor beads. The flavor beads are then dried at about 160° F. for about 2 hours by a food dehydrator to form MCC flavor beads having a diameter of about 1.0 mm and a moisture content of less than about 5%.

In a second embodiment, tobacco-free flavor beads can be formed via ionic gelation. Tobacco-free flavor beads formed by ionic gelation include pectin, sodium alginate or both. In the preferred embodiment, the pectin and sodium alginate are cross-linked. Also preferably, the flavor beads include at least one additional polymer that is more soluble in saliva than the cross-linked pectin and/or the cross-linked sodium alginate.

In a preferred embodiment, the pectin and/or sodium alginate are included in the flavor beads in an amount of at least about 0.5 wt % based on the weight of the flavor beads. The flavor beads can comprise pectin in an amount of up to about 90 wt %.

Preferably, the pectin and/or sodium alginate is cross-linked using a suitable cross-linking agent. Suitable cross-linking agents include monovalent metal ion salt or a bivalent metal ion salt. While both monovalent and bivalent metal ion salts may be used, preferably a bivalent metal ion salt is used. Suitable bivalent metal ion salts include, without limitation, calcium lactate, calcium chloride, calcium sorbate, calcium propionate and the like. Calcium lactate is preferred since it is approved for use in food products. Preferably, the cross-linking agent is included in the flavor beads in an amount of up to about 0.5 wt % based on the weight of the flavor beads.

Also preferably, the flavor beads comprise at least one modified starch. Preferred modified starches are those that have been modified with octenyl succinic anhydride (generally referred to as NOSA starches or OSAn Starches). Preferred embodiments include a first modified starch and a second modified starch. Preferably, the first modified starch is HI-CAP 100, which is available from National Starch & Chemical Co. HI-CAP 100 is suitable for the encapsulation of flavorants and is also characterized by excellent resistance to oxidation. Preferably, the second modified starch is N-CREAMER 46, also available from National Starch & Chemical Co., which is characterized by excellent emulsion stabilization. Preferably, the first starch is included in an amount of up to about 20 wt % based on the weight of the flavor beads and the second starch is included in an amount of up to about 10 wt % based on the weight of the flavor beads.

Not wishing to be bound by theory, it is believed that the addition of a first starch and/or a second starch aids in controlling the flavor release rate of the flavor beads. Since the pectin and/or sodium alginate are cross-linked during ionic gelation, the starches have a higher solubility and thus release flavorants at a different rate than pectin and/or sodium alginate. Thus, preferred flavor beads formed via ionic gelation release flavor for up to about 80 minutes in water and/or saliva depending upon the polymer ratio contained therein. Preferably, the flavor beads contain multiple polymers having different solubility so that the flavorants are released at different times so as to prolong the experience of the user.

In addition, flavor beads containing starches taste smoother and/or creamier than flavor beads formed without starches. Also, the modified starches are polymers which exhibit lipophilic characteristics with excellent emulsification properties. As such, the starches aid in encapsulating hydrophobic flavorants in particular.

Also preferably, the flavor beads formed by ionic gelation include at least one flavorant. Suitable flavorants include those used in the MCC containing flavor beads described above. Preferably, the flavor beads formed by ionic gelation include at least one flavorant in an amount of up to about 60 wt % based on the weight of the flavor beads.

In the preferred embodiment, the flavor beads comprise about 50 wt % to about 80 wt % pectin, about 5 wt % to about 10 wt % of the first starch, about 1 wt % to about 5 wt % of the second starch and about 15 wt % to about 30 wt % flavorant.

EXAMPLE 2

About 2 ml of berry flavorant (e.g. strawberry, blueberry and/or raspberry flavorants), about 13 grams of pectin, about 1 gram of the first modified starch and about 0.5 gram of the second modified starch are homogenized with about 90 grams of distilled water at 4,500 rpm for 10 minutes at room temperature. About 20 ml 5% calcium lactate solution is added to the mixture and homogenized for about 2 minutes. The formed aqueous slurry is dried at about 160° F. for about 4 hours in a food dehydrator. Then, the dried material is ground into small beads having a diameter of about 1.0 mm by a coffee blender to form flavor beads having a moisture content of less than about 5%.

The resulting flavor beads containing at least one of MCC, pectin and sodium alginate are preferably in the form of spheroids that are substantially round or oval in shape. Also preferably, the flavor beads range in diameter from about 0.5 mm to about 2.0 mm (e.g., about 0.75 mm to about 1.75 mm or about 1.0 mm to about 1.5 mm).

In an embodiment, the flavor beads can further comprise at least one coating on the external surface thereof. The coating is preferably formed of a highly soluble material and at least one flavorant, such that flavorants are quickly released from the coating when placed in a user's mouth. Preferred coatings comprise corn zein, ethyl cellulose and/or food grade waxes. The flavorants in the coatings can be the same flavorant or a different flavorant than the flavorant incorporated in the flavor beads.

Once processed, the flavor beads 14 can be placed in a pouch wrapper 55 to form an oral pouch product 50, as shown in FIG. 1. Preferably, no ingredients other than the flavor beads 14 are contained in the oral pouch product 50.

Figure 2:
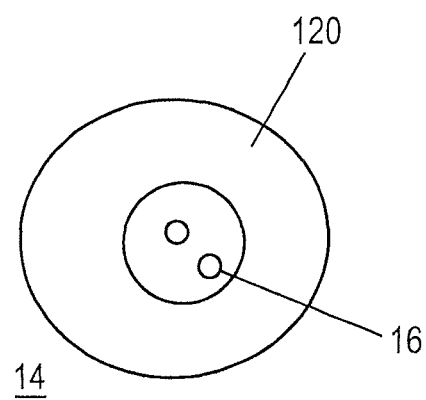
FIG. 2 is an illustration of a cross-sectional view of a flavor bead including at least one coating.

The oral pouch products 50 that incorporate the flavor beads 14 described herein can take various shapes, which are preferably designed to be inserted into the oral cavity, where they come into contact with the user's saliva, and release flavorant into the saliva. Typically the release of flavorant is designed to occur according to a time profile. For example, a flavorant release profile may include a burst of flavorant when the oral pouch product 50 is first introduced into the oral cavity, followed by a slow decrease in flavorant release over time, or may include a steady release of flavorant over the consumption of the oral pouch product 50. For example, the tobacco-free flavor beads 14 contained within the pouch wrapper 55 can include a highly soluble coating 120 (shown in FIG. 2) that comprises flavorants 16. When placed in the mouth, the coating 120 quickly dissolves to release the flavorants 16.

In the preferred embodiment, the oral pouch products 50 described herein contain only tobacco-free flavor beads 14. Thus, the flavor beads 14 make up the majority of the weight of the finished oral pouch product 50. In an embodiment, the flavor beads 14 substantially completely fill the interior of the porous pouch wrapper 55. Alternatively, the flavor beads 15 partially fill the interior of the porous pouch wrapper 55. The oral pouch product 50 provides for the delivery of an engaging, flavorful, and/or aromatic experience by delivering flavorants to a user in a consumable unit designed to be inserted in the mouth. The flavor beads 14 prepared as described herein and that contain the same flavorant, or that contain two or more different flavorants, may be used in an oral delivery pouch product 50 by introducing the flavor beads 14 as filling material into the cavity of the pouch wrapper 55.

Preferably, the flavor beads 14 facilitate high-speed pouch filling operations during the manufacture of oral pouched products 50 because flavor beads 14 tend to more consistently and cleanly flow into and out of metering feed machinery, with less scatter and dusting than loose, irregular particles and/or fibers that can be contained in other oral pouch products.

As illustrated in FIG. 1, an oral pouch product 50 includes an inner material. The inner material comprises only flavor beads 14 enclosed in a pouch wrapper 55.

The porous pouch wrapper 55 described herein can be made of a porous material, such as a paper or fabric, such as a nonwoven fabric or a paper of the type used to construct filters or tea bags. The porous pouch wrapper should be capable of allowing the flavors contained in the flavor beads of the oral pouch product to diffuse through the pouch wrapper and into the user's mouth. The porous pouch wrapper should also be capable of accepting the coating material as described herein. Desirably, the porous pouch wrapper is made from a material suitable for contact with food, such as materials used in packaging or handling foods. Preferred porous materials include, but are not limited to, films, gelatin, food casings, carrageenan, biopolymers, fabric (woven or non-woven), and/or paper such as filter paper, papers used to construct tea bags, coffee filters, and the like.

In a preferred embodiment, the porous membrane maintains sufficient structural integrity during the time period that the pouch wrapper 55 is used so that the inner material is retained therein. In another embodiment, the pouch wrapper 55 may be dissolvable or disintegrable and composed of soluble polymers. In an embodiment, flavorants may be added to the pouch wrapper 55 to provide additional flavor to the user.

Preferably, the oral pouch product 50 fits completely and comfortably inside the user's mouth. Preferably, the oral pouch product 50 fits discreetly within the user's mouth, and more preferably between the cheek and teeth or gums. A user can suck, chew, or otherwise orally manipulate the pouch product 50 to release the flavors contained therein.

The oral pouch product 50 may have a square, rectangle, circular, moon, crescent, or oblong shape. The oral pouch product 50 can also be shaped like a half-moon or D-shape, or can take other shapes, including, without limitation oval, pouch-shape, rod-shape, cylindrical, tea leaf, tear drop, or hourglass shapes. In some embodiments, the pouch-shape can be similar to a ravioli or pillow shape. Other shapes may be utilized so long as the shapes fit comfortably and discreetly in a user's mouth. In some embodiments, the shape of the pouch can indicate the releasable ingredient, such as the flavor. Thus, in these embodiments, the oral pouch product 50 may be shaped as fruits, vegetables, or other objects that connote a particular releasable ingredient. For instance, the oral pouch product 50 could be in the shape of a banana to indicate a banana flavor or in the shape of a strawberry to indicate a strawberry flavor.

Preferably, sharp corners are avoided as sharp corners may lead to oral discomfort. The pouch wrapper 55 is sealed around one or more edges to contain the flavor beads 14 within the pouch wrapper 55.

Preferably, the pores in the pouch wrapper 55 allow flavors to diffuse through the material and into the user's mouth.

The oral pouch product 50 generally is sized and configured to fit comfortably in a user's mouth. Preferably, the oral pouch product 50 weighs about 0.2 g to about 5.0 g (e.g., about 0.1 g to about 1.0 g, about 1.0 g to about 2.0 g, about 2.0 g to about 3.0 g, about 3.0 g to about 4.0 g or about 4.0 g to about 5.0 g). Also preferably, the oral pouch product 50 is about 0.25 inch to about 2.0 inches in width, about 0.25 inch to about 2.0 inches in length, and about 0.25 inch to about 2.0 inches thick. In an embodiment, the oral pouch product 50 is about 0.1 inch to about 2.0 inches in width, about 0.1 inch to about 2.0 inches in length and about 0.1 inch to about 2.0 inches thick.

The oral pouch product 50 can preferably deliver a plurality of flavorants to the user for a period of about 15 minutes to about 80 minutes (e.g., about 20 minutes to about 75 minutes, about 25 minutes to about 70 minutes, about 30 minutes to about 65 minutes, about 35 minutes to about 60 minutes, about 40 minutes to about 55 minutes or about 45 minutes to about 50 minutes). Preferably, the oral pouch product 50 is discarded after a single use. Also preferably, the oral pouch product 50 weighs between about 0.2 g and 5.0 g. The weight is predominately the result of the weight of the enclosed tobacco-free flavor beads 14.

In an embodiment, the pouch wrapper 55 can also be provided with at least one coating that can release flavorants or other ingredients to the user's mouth when in contact with saliva.

In this specification, the word "about" is often used in connection with numerical values to indicate that mathematical precision of such values is not intended. Accordingly, it is intended that where "about" is used with a numerical value, a tolerance of 10% is contemplated for that numerical value.

While the foregoing describes in detail tobacco products and methods of forming tobacco products with reference to a specific embodiment thereof, it will be apparent to one skilled in the art that various changes and modifications and equivalents to the method of treating tobacco and forming tobacco products may be employed, which do not materially depart from the spirit and scope of the invention.

We claim:

1. A tobacco-free oral pouch product providing immediate and long lasting flavor release comprising:
    a pouch wrapper; and
    tobacco-free flavor beads formed by ionic gelation contained within the pouch wrapper, the flavor beads comprising:
        at least one of cross-linked pectin and cross-linked sodium alginate;
        at least one polymer having a higher solubility in saliva than the at least one cross-linked pectin and/or cross-linked sodium alginate wherein the at least one polymer is at least one modified food starch; and
        at least one flavorant,
    wherein the moisture content of the tobacco-free flavor beads is less than about 5% and wherein the tobacco-free flavor beads provide immediate release of the flavorant upon placement in a user's mouth and long lasting release of the flavorant for about 15 minutes to about 80 minutes and wherein the oral pouch product contains only tobacco-free flavor beads.

2. The oral pouch product of claim 1, wherein the tobacco-free flavor beads comprise about 0.5 wt % to about 80 wt % pectin, about 5 wt % to about 10wt % of a first modified food starch, about 15 wt % to about 30 wt % flavorant, about 0.001 wt % to about 0.5 wt % calcium lactate and about 1 wt % to about 5 wt % of a second modified food starch, the first modified food starch being different than the second modified food starch.

3. The oral pouch product of claim 1, wherein the tobacco-free flavor beads further comprise at least one coating.

4. The oral pouch product of claim 3, wherein the at least one coating is a food grade wax coating, a corn zein coating and/or an ethyl cellulose coating.

5. The oral pouch product of claim 1, wherein the tobacco-free flavor beads have a diameter of about 0.5 mm to about 2.0 mm.

6. The oral pouch product of claim 1, wherein the tobacco-free flavor beads have a density of about 0.8 to about 1.0 g/cm$^3$.

7. The oral pouch product of claim 2, wherein the first and second modified food starches are food starches modified with octenyl succinic anhydride.

8. The oral pouch product of claim 2, wherein the first modified food starch exhibits greater resistance to oxidation than the second modified food starch.

9. The oral pouch product of claim 1, wherein the beads contain multiple polymers having different solubility so that flavorants are released at different times.

10. The oral pouch product of claim 1, wherein the beads contain a first flavorant and the beads are coated with a coating containing a second flavorant.

11. The oral pouch product of claim 10, wherein the second flavorant is the same as the first flavorant.

12. The oral pouch product of claim 10, wherein the second flavorant is different than the first flavorant.

* * * * *